(12) United States Patent
Chitty et al.

(10) Patent No.: US 9,558,599 B2
(45) Date of Patent: Jan. 31, 2017

(54) STRESS AND/OR ACCUMULATED DAMAGE MONITORING SYSTEM

(71) Applicant: TECH MINING PTY LTD, Dingley Village (AU)

(72) Inventors: Gerard Bernard Chitty, Glen Waverly (AU); Lasha Biyanga Aponso, Malvern East (AU)

(73) Assignee: TECH MINING PTY LTD, Dingley Village, Victoria (AU)

( * ) Notice: Subject to any disclaimer, the term of this patent is extended or adjusted under 35 U.S.C. 154(b) by 0 days.

(21) Appl. No.: 15/068,630

(22) Filed: Mar. 13, 2016

(65) Prior Publication Data
US 2016/0196699 A1    Jul. 7, 2016

Related U.S. Application Data

(63) Continuation of application No. 14/343,408, filed as application No. PCT/AU2012/001121 on Sep. 19, 2012, now Pat. No. 9,315,970.

(51) Int. Cl.
| | |
|---|---|
| *G07C 5/02* | (2006.01) |
| *E02F 9/20* | (2006.01) |
| *E02F 9/26* | (2006.01) |
| *G01M 5/00* | (2006.01) |
| *E21B 15/04* | (2006.01) |
| *G07C 5/00* | (2006.01) |

(52) U.S. Cl.
CPC ............... *G07C 5/02* (2013.01); *E02F 9/2054* (2013.01); *E02F 9/267* (2013.01); *E02F 9/268* (2013.01); *E21B 15/04* (2013.01); *G01M 5/0033* (2013.01); *G07C 5/006* (2013.01); *G07C 5/008* (2013.01)

(58) Field of Classification Search
CPC ........... G07C 5/02; G07C 5/006; G07C 5/008; E02F 9/2054; E02F 9/268; E02F 9/267; E21B 15/04; G01M 5/0033
See application file for complete search history.

(56) References Cited

U.S. PATENT DOCUMENTS

| | | | | |
|---|---|---|---|---|
| 8,075,002 B1* | 12/2011 | Pionke | ................... | B60G 17/02 280/5.5 |
| 2006/0085118 A1* | 4/2006 | Baldwin | ................. | E02F 9/264 701/50 |
| 2009/0125194 A1* | 5/2009 | Haller | ................ | B62D 33/0608 701/48 |
| 2012/0029895 A1* | 2/2012 | Xi | ........................ | G01V 99/005 703/10 |

* cited by examiner

*Primary Examiner* — Rodney Butler
(74) *Attorney, Agent, or Firm* — Louis Ventre, Jr.

(57) ABSTRACT

A monitoring system implemented on a truck. The system includes: a plurality of strain and pressure gauges at critical locations at which a failure is predicted to occur; a processor with memory hardware configured to process the acquired real-time data from the gauges to determine measures of actual instantaneous stress and a real-time operating state; an output device configured to provide information comparing measures of actual instantaneous stress with corresponding reference values of maximum allowable stress, and to provide the real-time information derived from the real-time operating state. The real-time information derived from the real-time operating state preferably includes an amount of cumulative damage or closeness to failure having regard to the measures of actual instantaneous stress and the real-time operating state.

12 Claims, 10 Drawing Sheets

STRESS AND/OR ACCUMULATED DAMAGE MONITORING SYSTEM

FIELD

The present invention relates to earthmoving equipment, in particular to a real-time stress and/or accumulated damage monitoring system.

BACKGROUND TO THE INVENTION

In the mining industry there is a continual effort to lower the cost of extraction of ore or overburden. A competition in the cost calculation exists between operating earth or ore extraction equipment at a maximum capacity and the damage caused to the equipment by overloading or fatigue. Manufacturers of mining equipment typically seek to protect themselves from liability for equipment failure by specifying conservative operating conditions that attempt to keep the failure rate very low, whereas the interest of the mine operator is to find the most economical balance between ore extraction and damage that minimizes the cost per tonne of ore extraction.

Manufacturers and third party providers provide a range of monitoring systems to provide information on loads and relative stresses experienced by draglines, utilizing strain gauges on certain representative structural components. Using such systems it is possible to record a time profile of the strain measured at the strain gauges and thereby provide reports on how the strain varies from one time period relative to another, enabling relative comparisons to be made between different operators and operating conditions and information on which time period produced relatively more stress/damage at the measured locations compared to another. While useful, such relative information cannot advise on how close the equipment is to failure or how much damage is occurring through fatigue. Without such information, the monitoring system is of limited use in assisting the mine operation and equipment operator in their goal in cost-efficiently maximizing production while minimizing damage to the equipment.

According to the current state of public knowledge in the art, monitoring systems that can usefully advise in real-time on whether the structure is operating within the design limits, the actual closeness to failure or the actual rate of cumulative damage, is not available. The current systems provide a relative measure which could lead to inaccuracies that could result in frequent false alarms and warnings.

There is therefore a need to provide an improved monitoring system that can provide such information.

Through an accumulation of long standing experience and research, the inventor has realized that enabled by careful observation and structural analysis as described herein guiding the placement, calibration and interpretation of strain gauges, a monitoring system can be provided that can surprisingly provide such reliable direct advice, in real-time to an operator and to mine management.

SUMMARY OF THE INVENTION

According to a broad aspect of the invention there is provided a stress and/or accumulated damage monitoring system for earth moving equipment. The system includes strain gauges that measure strain at locations on earth moving equipment. The earth moving equipment is one of an excavator, a truck, a shovel, a drill, a wheel loader, and a grader.

The system further includes a data acquisition unit to acquire real-time strain data from the strain gauges and a processor and memory to process the acquired real-time strain data. This data is used calculate one or more measures of actual accumulated damage and/or actual instantaneous stress.

The system further includes an output device to provide information comparing the measures with corresponding reference values.

In the embodiment configured for an excavator, the system uses at least one of the strain gauge locations on a boom or stick of the excavator. The strain gauges on the boom and stick are preferably used to accurately estimate the stress or cumulative damage that the boom and stick experience during a range of operating modes. Preferably these strain gauge locations are those determined to be the most vulnerable to failure during operation and those most useful for predicting failure or cumulative damage in another part of the boom or stick. Preferably, at least one of the output devices is a display in a driver's cabin of the excavator.

Preferably, at least one of the output devices is equipped to wirelessly transfer data to a manager's office or other remote locations to enable the information derived from the measures and the operating state to be used in maintenance planning, operator training, mining planning and/or other management tasks. Information comparing the measure of accumulated damage with its corresponding reference values may be expressed by at least one of the output devices so as to advise or trigger the required level of inspections of the boom, stick and the main frame.

Preferably, the accumulated damage is used to define or adjust the reference values associated with the strain gauge locations to reduce unscheduled stoppages.

The system may include at least one load, position or orientation gauge for gauging the force applied by an actuator or its position or orientation. Thus, the data acquisition unit in the system preferably acquires real-time load, position or orientation data from the load position or orientation of one or more of the gauges.

The processor and memory used in the system processes the acquired real-time load, position or orientation data to determine an operating state of the equipment. At least one of the output devices also provides information derived from the operating state. Where the system is adapted for an excavator, at least one of the strain gauge locations may be disposed on a boom or stick of the excavator and the operating state may include information on the position of the boom and stick. The information derived from the operating state may include programmed advice regarding how to reduce one of the measures of instantaneous stress or accumulated damage. Raw data may be recorded and analyzed to clearly identify a root cause for an incident of extreme high stress or damage.

In various embodiments, the information comparing the measures with corresponding reference values is presented as the measures of instantaneous stress or accumulated damage normalized with respect to the reference values; the reference value for stress is a maximum allowable stress; the reference value for accumulated damage is a calculated from a predefined target fatigue rate; the measures of accumulated damage are compared with the reference values by expressing them as implied lifetimes or maintenance intervals; and an alarm is activated on at least one of the output devices when one of the measures of instantaneous stress exceeds or approaches the associated reference value.

The system may be configured for a truck wherein at least one of the strain gauge locations is disposed on a chassis of the truck. An alarm may be activated on at least one of the output devices when one of the measures of instantaneous stress exceeds or approaches the associated reference value. The alarm may comprise feedback to a driver of the truck advising the driver to reduce speed by a specified amount if a selected one or more of the threshold limits is exceeded when hauling.

The system may be configured for a drill having a pivotable mast. The strain gauge locations are then, preferably, one or more locations critical for detecting when an operator is attempting to raise the mast with a mast locating pin still engaged, or is toggling hoist cylinders of the mast to disengage a stuck locating pin.

The system may be configured for an hydraulic shovel.

The system may be configured for an electric rope shovel having a boom and dipper handle. For this embodiment, the strain gauge locations preferably include one or more locations on the boom. The strain gauge locations on the boom may comprise one or more locations that can be used to infer lateral bending stresses occurring in the dipper handle.

DETAILED DESCRIPTION OF EMBODIMENTS

Non-limiting embodiments of the current invention will now be described.

EXAMPLE 1

Hitachi EX3600 Excavator

Figure 1:
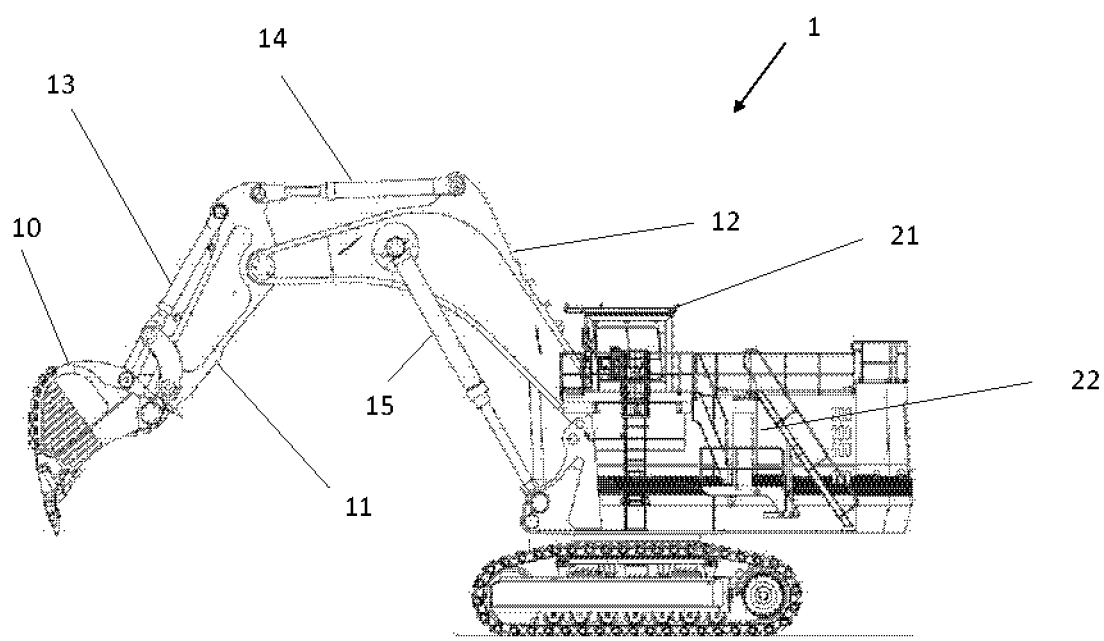
FIG. 1 is a diagram of an excavator to which an embodiment of the invention has been applied and is described herein.

Referring first to FIG. 1, the embodiment to be described is applied to an Hitachi EX3600 excavator 1 comprising bucket 10, stick 11 and boom 12. Boom 12 is rotatably attached to the excavator body and is driven by hydraulic piston actuator 15. Stick 11 is rotatably attached to boom 12 and is driven by hydraulic piston actuator 14. Similarly, bucket 10 is rotatably attached to stick 11 and is driven by hydraulic piston actuator 13. Excavator body has driver's cabin 21 atop engine room 22.

Figure 2:
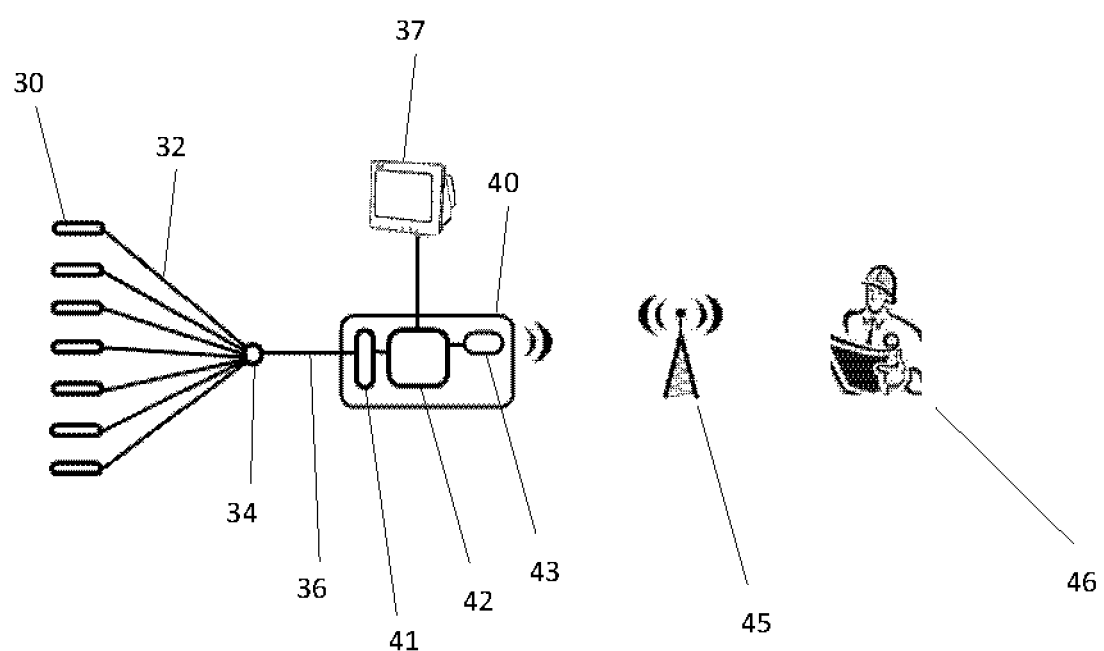
FIG. 2 is a block diagram of an embodiment of the invention.
Figure 3:
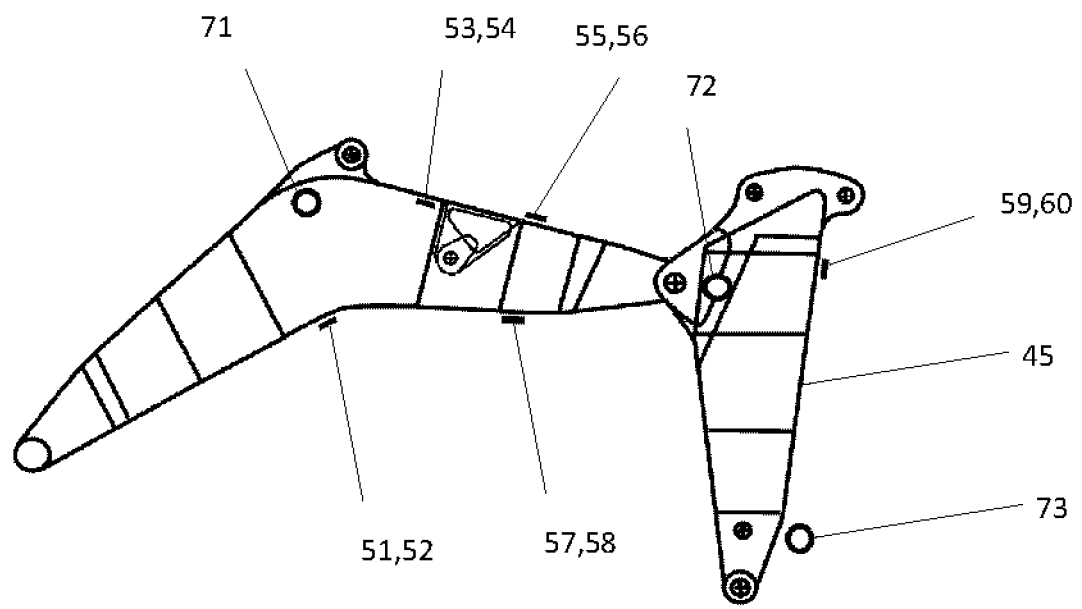
FIG. 3 is a diagram of a side view of the boom and stick of a Hitachi EX3600 excavator showing sensor locations.

Referring also now to FIGS. 2 and 3, a plurality of sensors 30 are distributed over boom and stick, including piezoelectric strain gauges, pressure sensors and inclinometers. The strain gauges 52-60 are located at strain gauge locations determined by detailed analysis (described in more detail later) as the most critical locations on the boom and stick that can be used to accurately estimate the stress or cumulative damage that the boom and stick experiences during a range of operating modes.

In making best use of the invention, considerable care is taken in deciding these locations, as the extent to which they are accurate has a large bearing on the usefulness of the absolute measures of accumulated fatigue and/or instantaneous stress that are reported in real-time by the system for optimizing the operation of the excavator. In FIG. 3, showing the critical locations identified by the inventor for the Hitachi EX3600, pairs of strain gauge locations, on the left or right side in the third dimension, are shown by short black lines. For example, strain gauges 51 and 52 are located where shown on the bottom plate, close to the left and right edge of the boom respectively. By contrast, strain gauges 53 and 54 are located where shown on top left and right side plates of the boom. Locations 51 to 54 are useful because they are predicted by detailed analysis and observed in the field to be points of maximum stress and failure cracks in common operating modes. The strain gauge locations are useful to be provided in pairs such as 51 and 52 on the left and right sides respectively, as differential readings between the individuals of a pair together with the strain gauges 55-58 detects a twisting torque or lateral bending, which can be used to advise an operator of uneven loading or impact, or side loading, or to further predict closeness to failure at other unmeasured locations. Locations 55-58 are useful because detailed analysis shows that these locations, while not likely to fail, are critical in predicting the stress state of the boom and stick at other locations that could fail due to specific loading scenarios. Locations 59 and 60 are useful in predicting the stress state in the stick in combination with locations 55-58.

It will be appreciated that locations will vary each time the manufacturer modifies its models, and detailed analysis to confirm the correct locations is required to be performed for each model variation.

Referring again to FIG. 2, sensor wire bundle 36 passes to computing equipment comprising data acquisition unit 41, processor and memory 42 and wireless communications controller 43. The computing equipment is composed of standard off the shelf systems and/or a custom designed single board system, conveniently located in engine room 22 and supplied with electrical power from the excavator system, but also containing rechargeable lithium battery power supply to prevent excessive restarts such as after the excavator is switched off during a shift. Input/Output device 37 in the form of touch screen is located for the use of the driver in cabin 21 or will utilize a 3rd party screen which is available in the cabin 21. Output and remote programming control is also provided by wireless communications controller 43 which links to wireless mine data network 45, enabling remote data communication with mine management 46.

Sensors 30 produce voltage signals which are transmitted as current signals over current loop circuits 32, conveniently terminating at a common point 32 on the hydraulic manifold.

Pressure Sensors

The pressure sensors which in this embodiment measure the force in the hydraulic circuits are most easily placed near the manifold where the hydraulic lines meet. Pressure sensors on the hydraulic lines are usually already supplied on the excavator when manufactured, and may alternatively be accessed. The pressure data is used to monitor the extensive and retractive forces applied to bucket, stick, boom, the force urging rotation of the body and the forwards/backwards force on the tracks. The net forces applied on the boom, stick and bucket and swing right or left are calculated as follows:

Net Force=(Extension Pressure−Retraction Pressure)×Strut bore area.

Net Swing Force=(Swing Right−Swing Left)×Strut bore area.

The measurement range for pressure transducers are ±10,000 psi.

Inclinometers

Inclinometer 71 measures the angle of inclination of boom 12, and inclinometer 72 measures angle of inclination of stick 11. A further inclinometer 73 may be positioned on the bucket 10 (bucket not shown in FIG. 3) to measure the angle of inclination of bucket 10, although this parameter is of less relevance.

Specification of Strain Gauges, Fitting and Processing

The measurement range for the strain gauges is around ±500 MPa (±2500 μs) with signal conditioning units have a dynamic range of ±1000 MPa (±5000 μs) and contains anti-aliasing filters and digital filters accurately measure up to a frequency range of 200 Hz with 16 bit resolution. The channel configuration defining the sensor location, type, and calibration factors to be used are specified and stored in a database and configuration files. Since the strain gauges are to be used to compute absolute measures of stress, care is taken carefully to install them with the appropriate waterproofing to minimize signal degradation. Drift is also automatically detected and the system balanced and calibration parameters updated regularly—drift in a strain gauge can be detected by calibrating strain to zero when the excavator is in an idle state with bucket resting on the ground in a specific configuration. Drift of sensors will affect the strength criteria as it will introduce an apparent additional strain (additional) to the dynamic strain measurement. The drift of sensors does not affect the rainflow analysis of cumulative damage calculations.

Integration of Sensor Readings to Derive Information

Using the inclinometer readings, the instantaneous position of the boom and stick is calculated by trigonometry, and together with the hydraulic pressure sensor readings a full real-time picture of an operating state of the excavator may be deduced by the system. An important operating state of high stress at certain of the strain gauge locations typically ensues when the boom and stick are fully outstretched, as detected by the inclinometers. A coincidence of high measured stress at one of these certain strain gauges and a measured fully outstretched operating state enables the processor to provide the operator with real-time information derived from the operating state, such as a warning and an appropriate corrective action to allow continued excavation without alarm and reduced cumulative damage with minimal or no impact on the mine plan. The appropriate corrective action might be for example, that during a double benching operation that is resulting in damage and stress outside design limits, the driver is advised to change the operating configuration by moving the excavator closer to the face and changing forces applied by the operator to the boom and stick actuators 13 and 14. Processor and memory 42 is programmed to respond to a range of such typical situations and to provide the appropriate real-time advice, in addition to providing simple high stress and/or accumulated fatigue alarms.

Data Acquisition and Calibration

Current loop sensor wires 36 terminate at multi-channel data acquisition unit 41 which is programmed to take samples at 20 times per second (up to 200 Hz may be useful). Raw data is used by the processor to calculate absolute measures of stress and accumulated fatigue, using a range of calibration constants, some predetermined based on the fatigue category detail, dead weight of the system at predefined configurations and some updated by regular calibration as required by the system software. Raw data is kept also to provide a "black box" resource to analyze or investigate any incident or when a failure occurs. The raw data can be replayed to clearly identify the root cause for incident of extreme high stress or damage as the combination of the all sensors can define the state of excavator operation at any instant.

Measurement of Instantaneous Stress and Comparison with Reference Values

As described above, the strain gauges are well protected from water damage and are regularly corrected for drift. The actual stress at a measurement location is calculated by multiplying the measured strain by Young's modulus for the thickness and grade of metal (usually steel) at the measurement location. This information is obtained from the manufacturer if available, or determined by direct measurement of the components if not obtainable from the manufacturer.

A reference value of maximum allowable tensile or compressive stress (or "strength") associated with the strain gauge location can be calculated, from a stress at which the equipment is predicted to fail, either at the strain gauge location itself (for locations such as 51-54) or at other non-measured locations predicted to be most vulnerable based on a FEA analysis, multiplied by a safety factor.

The processor calculates for data presentation purposes normalized compressive and tensile stresses as a ratio or percentage of the measured stress to the maximum allowable stress taking into account the dead load stress for the particular location at the set configuration using FEA when the system is calibrated.

Calculation of Cumulative Fatigue and Comparison with Reference Values

Rainflow analysis, the commonly accepted method of fatigue analysis, is carried out utilizing the data from each strain gauge to estimate cumulative damage and fatigue life. Digital filtering to cut off stress cycles (extension followed by contraction) lower than a pre-set value (e.g 2 MPa) is utilized to filter the data. The start and end of a digging cycle (dig, swing, dump and return) is determined by monitoring hydraulic pressure sensors and/or the inclinometer, and cumulative fatigue over the digging cycle is calculated. The cumulative damage per cycle or for a specific time period and the estimated fatigue life of the component (assuming that the excavator would operate continuously with a similar load cycle) is displayed to the operator and stored in the memory for use by maintenance personnel and engineers. The system is also integrated with some 3rd party suppliers of fleet management systems to provide cumulative damage per truck load cycle. The following equation is utilized to calculate cumulative damage (D):

$$D = K\Sigma n_i \sigma_i^m$$

where
$n_i$ is the number of stress cycles with a (digitally filtered) stress range of $\sigma_i$
K=damage factor
m=damage power.

The values of K and m are typically prescribed by engineering standards (m is typically 3) but may be varied by actual experience where the physical situation does not match the underlying assumptions.

The estimated damage per digging cycle is reported as damage per hour.

$$D_{hr} = 3600(D/t)$$

The Life (L) in service hours, of the particular location can be defined as:

$$L = 1/D_{hr}$$

The estimate fatigue is normalized for presentation as follows:

Normalized fatigue=Fatigue Life limit in service hours(LL)/L

The reference values of threshold limits (LL) for fatigue life are customized for each critical location, based on the needs of the customer (Productivity VS Machine component Life expectation). If the normalized fatigue exceeds 100%, this indicates that the fatigue is faster than planned and an alarm/warning is provided to the driver and the number of sensors that exceed the limit is recorded in summary information.

The accumulated damage may be used to define a trigger for inspection of the specific components such as the boom, stick so that any cracks initiating can be detected at an early stage prior to cracks reaching critical size which will force unscheduled stoppages. For example when the accumulated damage reaches a certain preset values the system will trigger an alarm to the operations to conduct an inspection of the boom at specific locations. The alarm is based on estimation on growth rate based on a pre-existing crack of a very small size. If a crack detected at an early stage, the machine could be operated safely for some time until repairs are scheduled with cumulative damage monitored and displayed to operations in real-time.

Display of Normalized Measures

Figure 4:
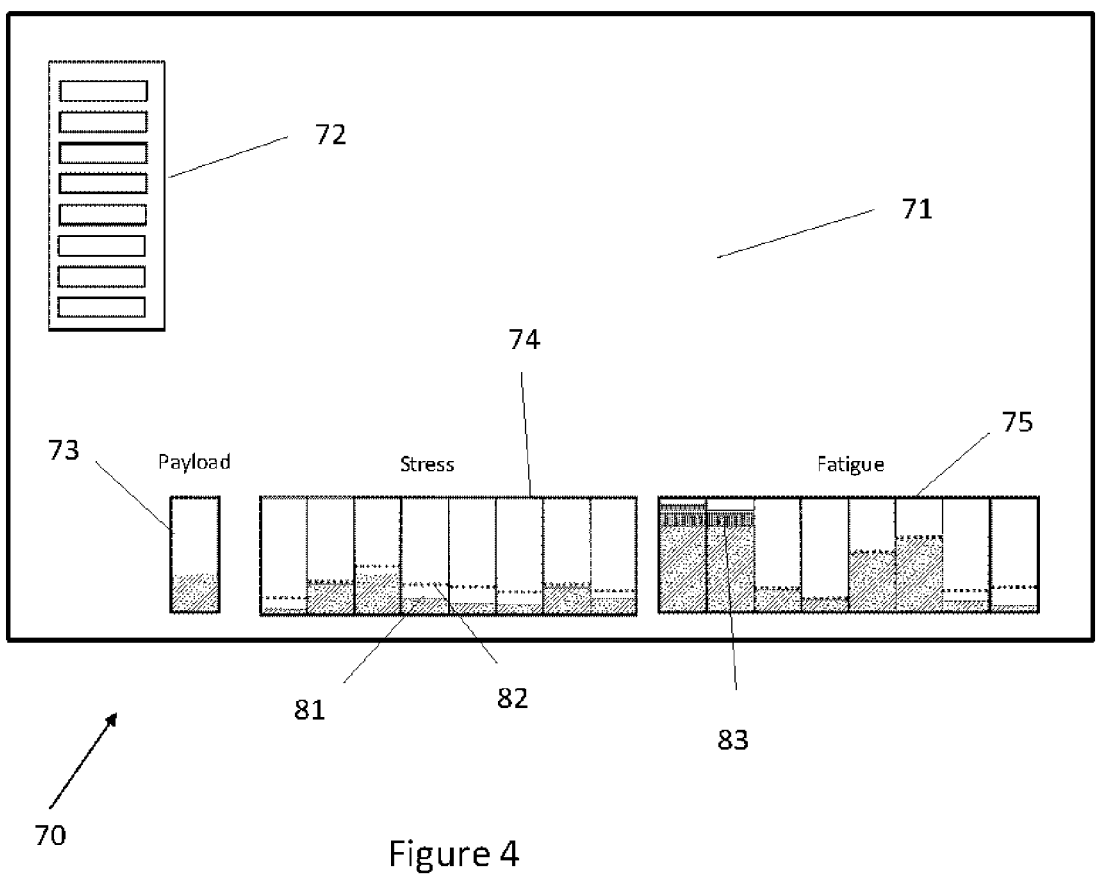
FIG. 4 is a screen display arrangement for an excavator in the embodiment described.

A typical display 70 on the cabin computer screen 37 output device is shown in FIG. 4. This display may be a standalone screen but may also be integrated with a display system of a third party supplier or the manufacturer, where other information is displayed in a central region 71.

Panel 72 shows a range of operator touch screen buttons such as to enter the operator's ID, a delay code (why the excavator is stopped), a dig mode intended by the operator. Alternatively, this information can be obtained from a third party via Ethernet, comms or TCP/IP. The sensor calibration can be performed via the touch screen. At the bottom of the screen a range of bars show measured absolute values normalized as described above. Panel 74 shows the normalized instantaneous stress at each sensor, and panel 75 shows the accumulated fatigue, typically over previous digging cycle, which is estimated by the software. Payload (the weight in the bucket) can also be calculated by various methods. Whenever a normalized value approaches 100%, warning-colored stripes 83 are shown and an alarm may sound. The maximum stress for the digging session and the maximum accumulated damage for the shift are also shown by dotted lines.

Identification of Strain Gauge Locations

The best use of invention relies on most accurate identification of the strain gauge locations, since if inappropriate, the stress and cumulative damage figures will not be comparable with a meaningful limit. The strain gauge locations should comprise the most critical locations on the boom and stick that can be used to accurately estimate the stress or cumulative damage that the boom and stick experiences during a range of operating modes. For the excavator of this embodiment, the modes include jocking, double benching, hard cap removal, bending or twisting.

These most critical locations are required to reliably determine the operating condition any time during the cycle and can vary for each type of excavator which has to be determined by detailed analysis on a case by case basis.

Computer structural modelling is an important tool in determining the best strain gauge locations. A 3-dimensional digital model of the boom, stick and bucket is developed by direct measurement of each component, including its material type and thickness or the manufacturer supplied drawings and welding parameters. The model is then subjected to finite element analysis (FEA) of the range of operating states in which the excavator is used, such as double benching, jocking, twisting/bending, below ground digging etc., for a range of positions and degrees of extension of the boom and stick. The loading conditions used for the analysis are derived by extensive measurements conducted on several excavators in various mine sites. As a result of these analyses, several critical locations are then identified typically as regions of sensitive locations on the boom and stick that can accurately measure the strain required to estimate the stress/cumulative damage the boom and stick sees during the operation. Some of the strain gauge locations will be more critical for strength, whereas others will be more critical for fatigue. Also, some of the strain gauge locations will be points of actual predicted failure, others will be points where measurement best helps predict undesirable stress or fatigue at another unmeasured location. The provision of strain gauges on both the left and right side of the boom and stick is highly relevant to operating states that impart a twisting or bending, typically caused by uneven loading or forces on the bucket, which result in large differences in the stress between left and right sensors.

Operating experience of actual failures observed in the field are simulated utilizing the FEA models created to confirm its accuracy. The operating experience is also used to directly define some strain gauge locations. The FEA analysis will help precisely identify the location at which to best place the strain gauge, which typically is best placed with a tolerance of 50-100 mm.

EXAMPLE 2

Trucks

Two embodiments applicable to a CATERPILLAR CAT793 C or D 240 tonne truck and a CAT 797 B or C 360 tonne truck will now be described together.

With currently available truck fatigue systems, the fatigue Life is based on measurements of all criteria (Racking+Pitching+Rolling) as measured from strut pressures, and producing a fatigue life prediction for the entire chassis, not for specific areas. In reality, the fatigue life will vary significantly from location to location, depending on the stress range, number stress cycles experienced and the fatigue category detail of the welded connection. The various locations on the chassis will also experience more or less damage due to the specific operating conditions such as rack, pitch, roll and bounce. Having one curve applied to all locations of the chassis can be extremely conservative or in some cases would be non-conservative.

Figure 5A:
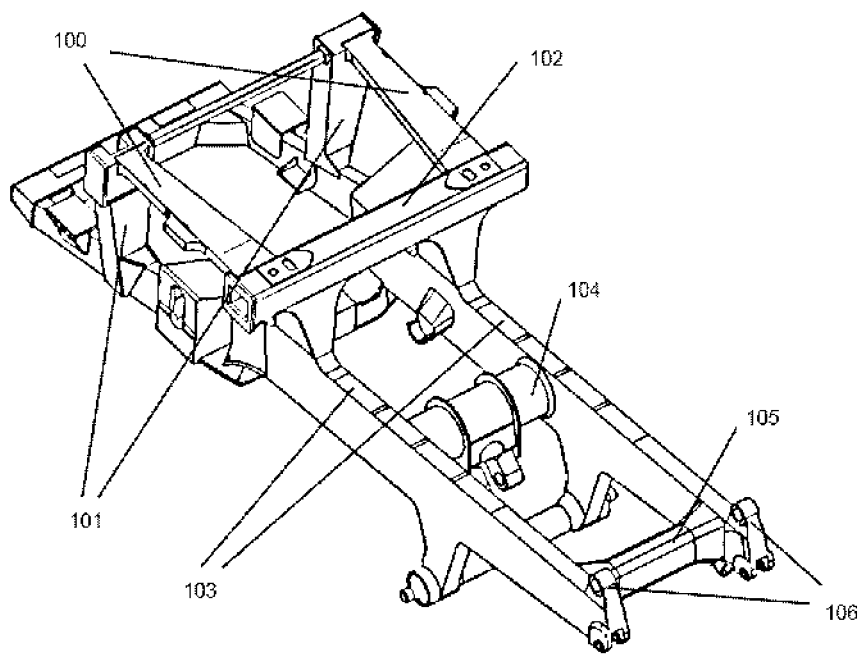
FIGS. 5a and 5b are views of the chassis of a Caterpillar CAT793 C or D truck to which another embodiment of the invention has been applied, showing regions where failures can occur.
Figure 5B:
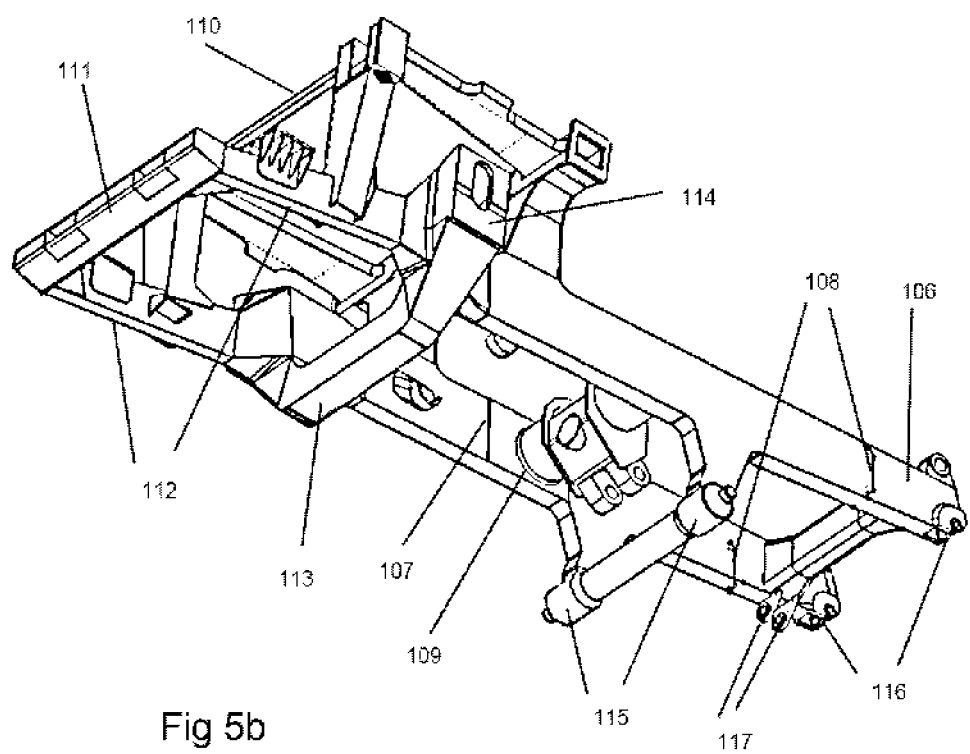

Referring now to FIGS. 5a and 5b, a chassis of the CAT 793 C or D truck is shown in two perspective views. Upper superstructure 100, Main rail vertical weld 107, tail casting to main rail welds 108, and torque tube to main rail weld 109 are all areas where cracking has commonly been observed. In addition, the following areas are also in risk of failure (lower risk of failure): support fore 101, rear cross beam 102, main rails 103, torque tube 104, rear cross tube 105, tail castings 106, front cross beam 110, bumper 111, front side rails 112, steering support 113, front strut support 114, hoist support 115, rear suspension supports 116 and pin bore for rod control 117.

Figure 5C:
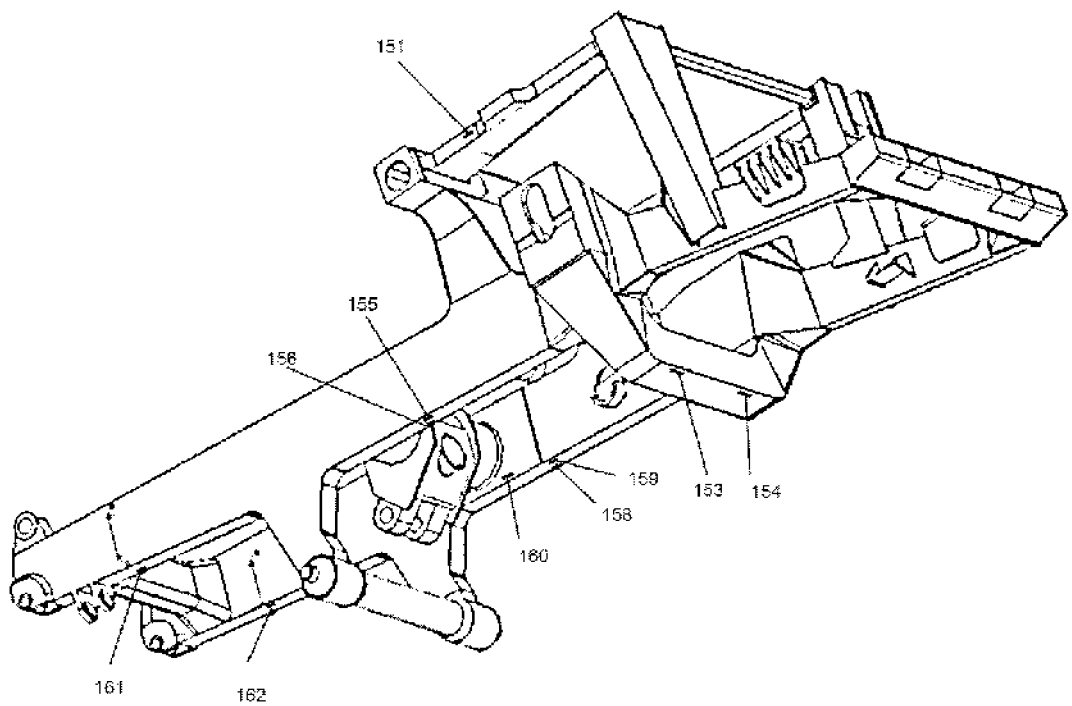
FIGS. 5c and 5d are views of the CAT793 C or D truck chassis of FIGS. 5a and 5d, showing sensor locations for the embodiment.
Figure 5D:
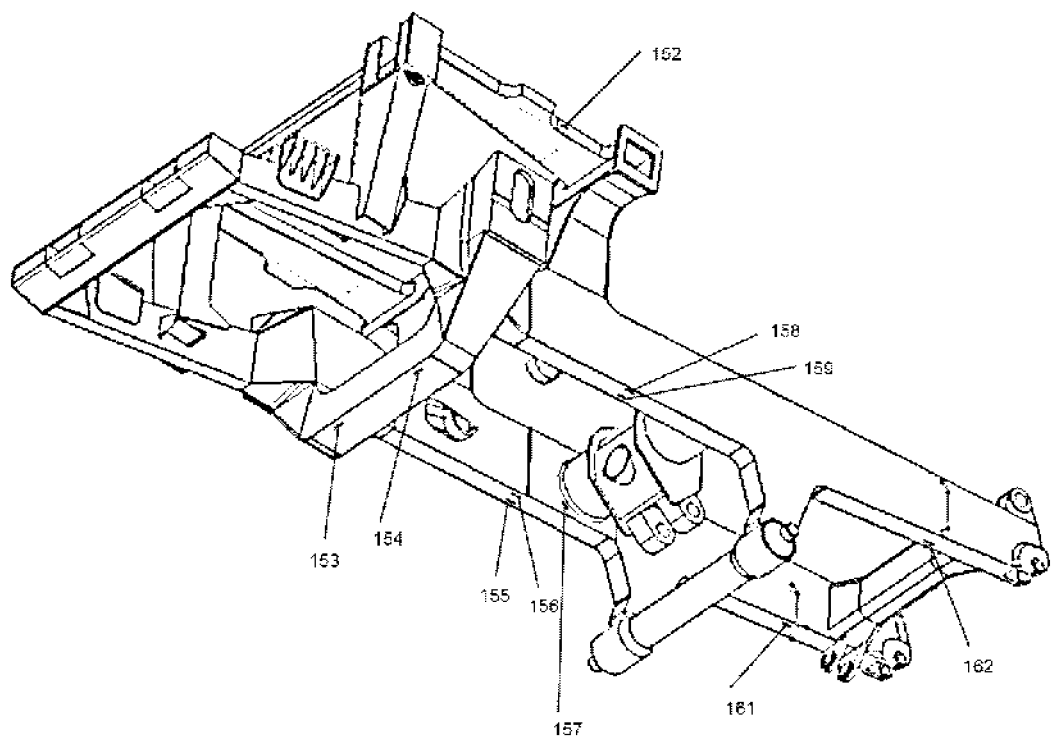

Referring now to FIGS. 5c and 5d, the chassis of the CAT 793 C or D truck is shown with strain gauge locations 151 to 162.

Figure 6A:
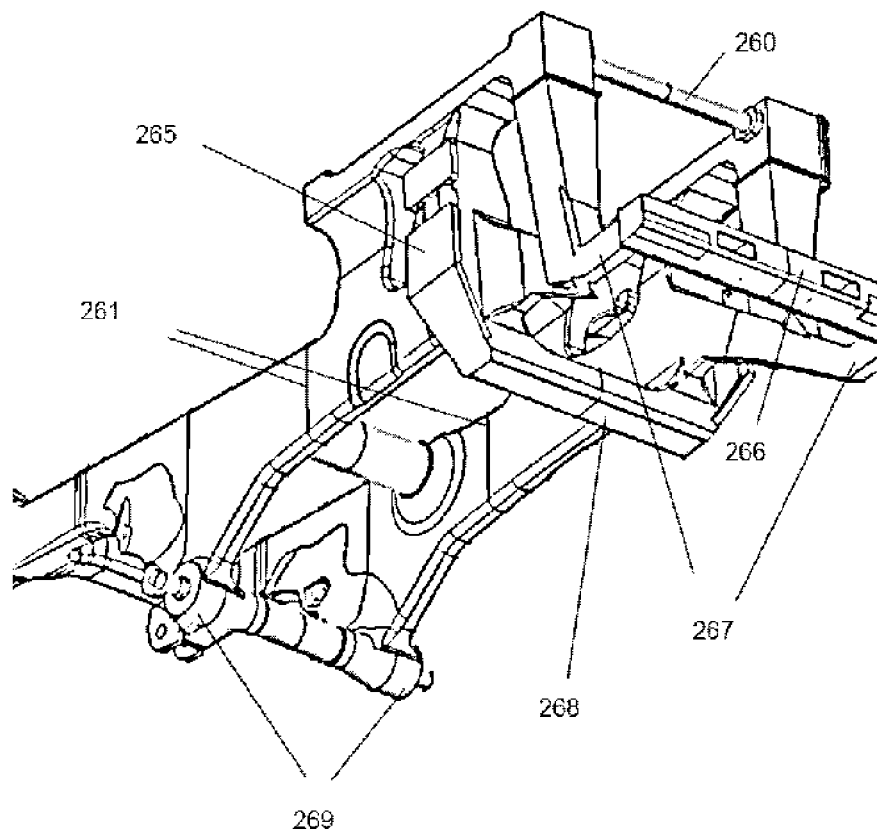
FIGS. 6a and 6b are views of the chassis of a Caterpillar CAT797 B or C truck to which yet another embodiment of the invention has been applied, showing regions where failures can occur.
Figure 6B:
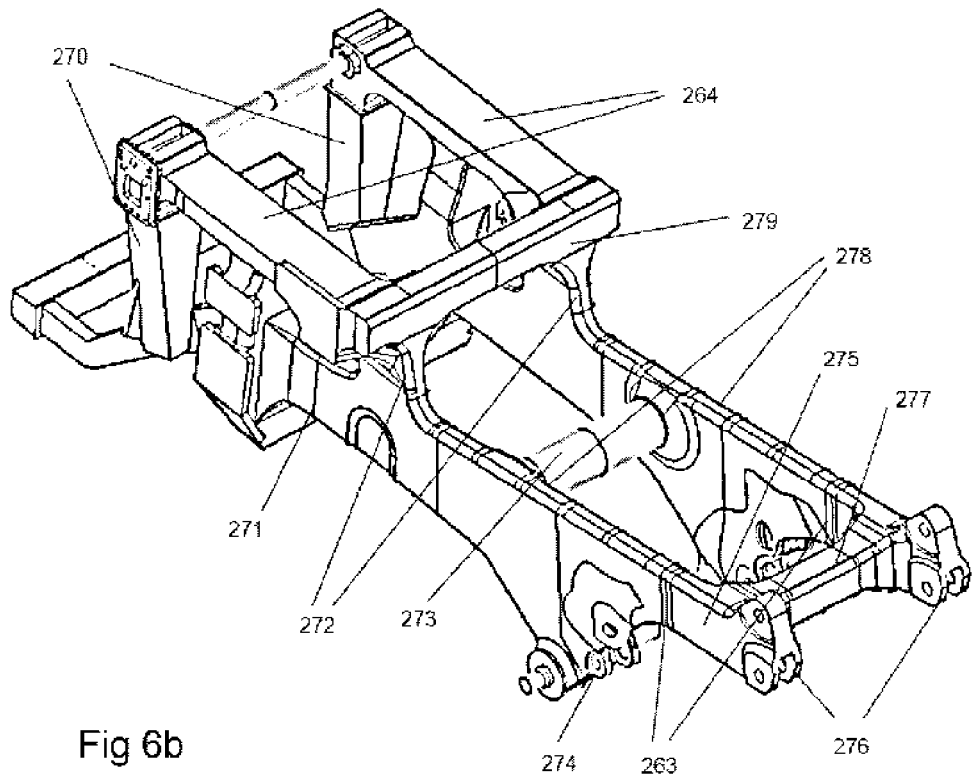

Referring now to FIGS. 6a and 6b, a chassis of the CAT 797 B or C truck is shown in two perspective views. Front cross beam 260, main rail casting weld 261, main rail to tail casting weld 263 and upper superstructure 264 are all areas where cracking has commonly been observed. In addition, the following areas are also in risk of failure (lower risk): front strut support 265, hoist supports 269, steering support 268, front side rails 267, bumper 266, support fore 270, rear cross beam 279, main rails 278, rear cross tube 277, rear suspension support 276, tail casting 275, torque tube 273, support rear 272, and casting weld 271 and links not shown in figure.

Figure 6C:
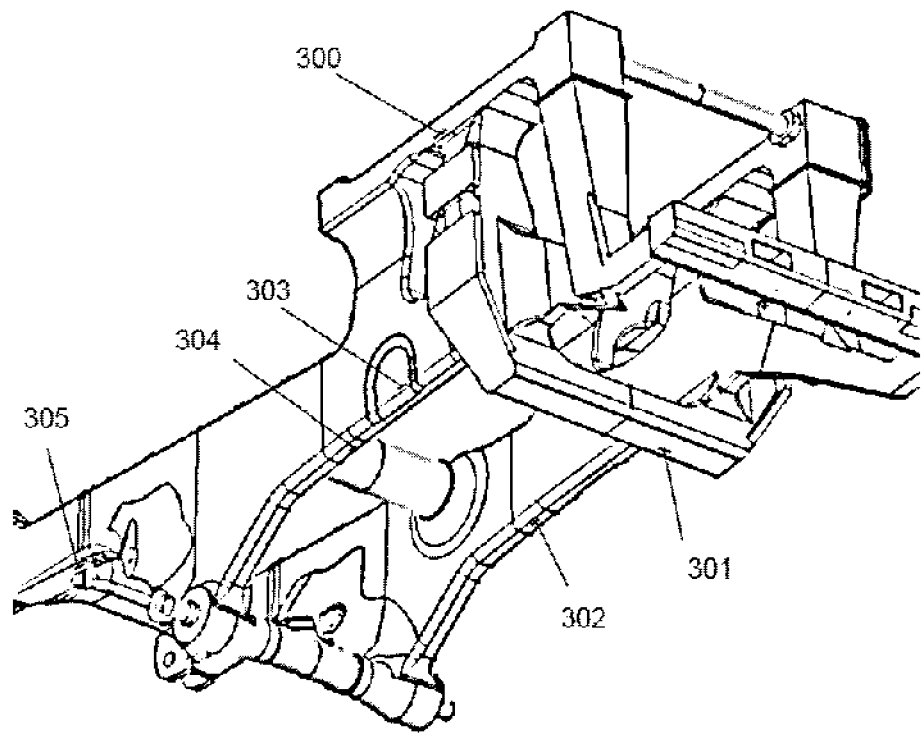
FIGS. 6c and 6d are views of the CAT797 B or C truck chassis of FIGS. 6a and 6d, showing sensor locations for the embodiment.
Figure 6D:
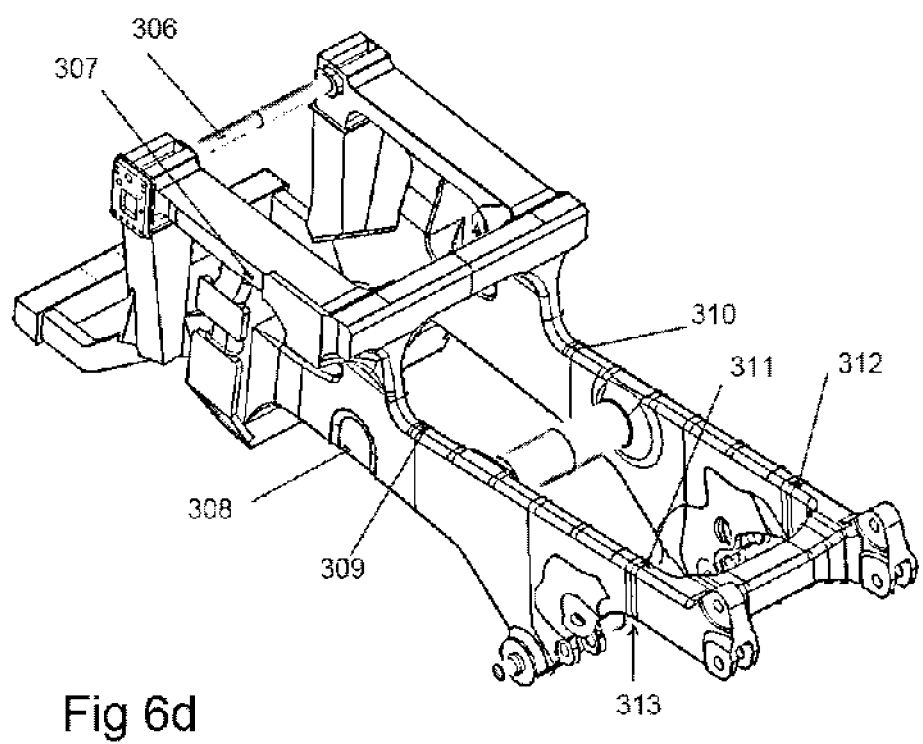
Figures 7A, 7B, 7C:
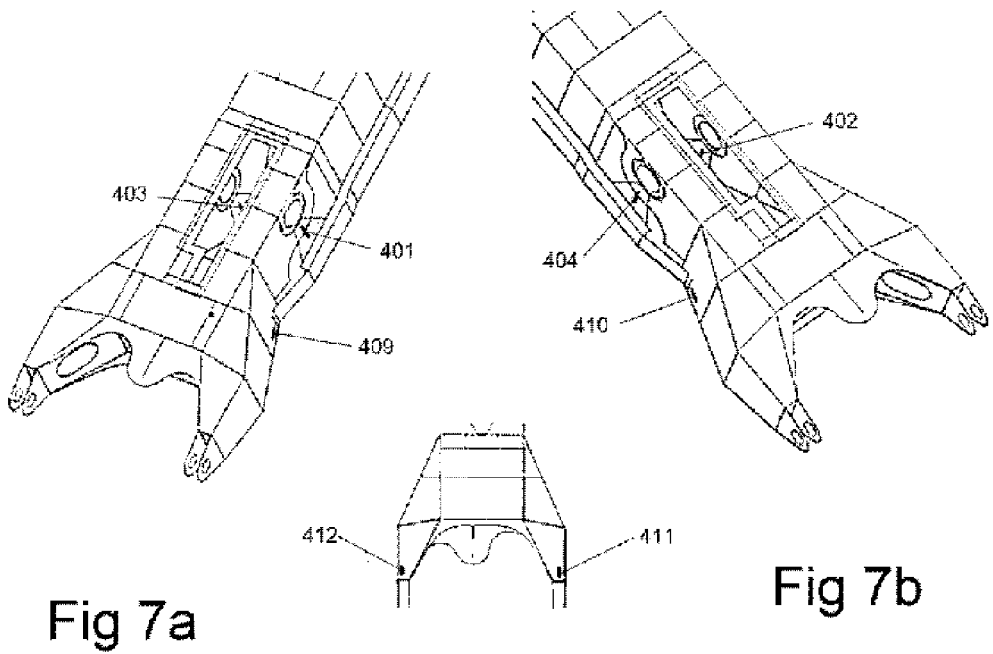
FIGS. 7a and 7b are perspective views showing sensor locations from different sides of the boom of an electric rope shovel, near the shipper shaft.
FIG. 7c is a view from the underside of the boom of the shovel showing further sensor locations.
Figure 8:
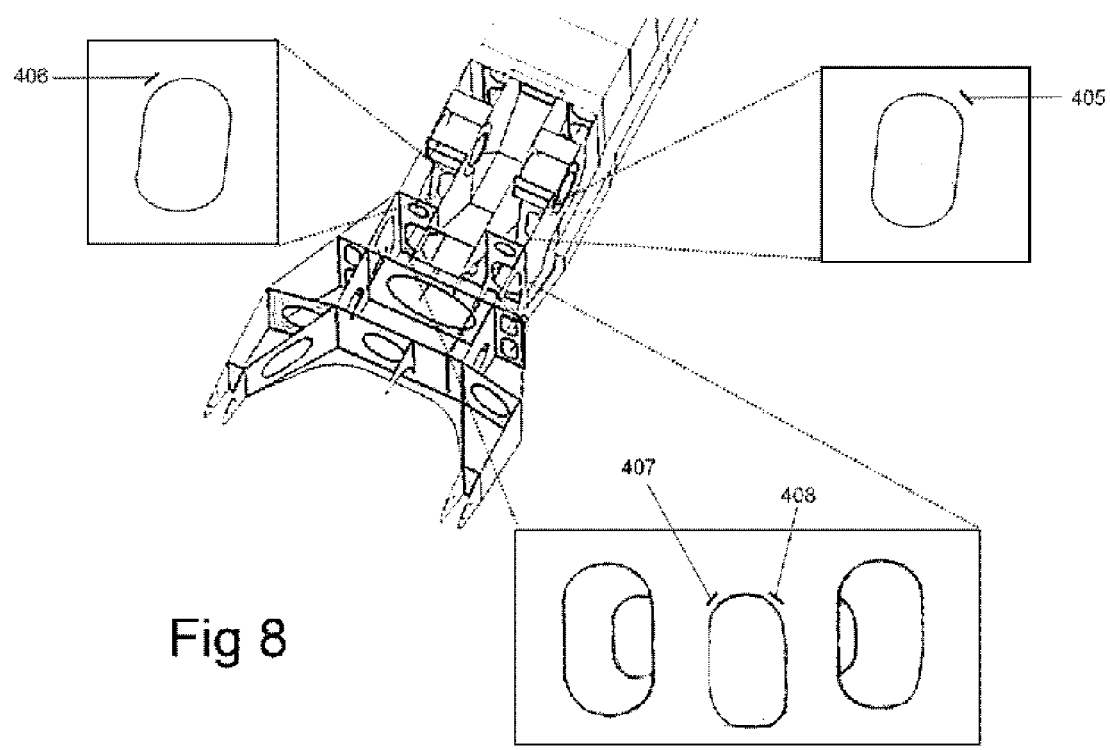
FIG. 8 is a view of interior components of the boom of FIGS. 7a, 7b and 7c, showing sensor locations for inferring dipper handle stresses due to lateral bending.

Referring now to FIGS. 6c and 6d, the chassis of the CAT 797 B or C truck is shown with strain gauge locations 300 to 313. There are an additional two strain gauges on the links (not shown).

Strain Gauge Locations

The strain gauges are placed at locations as referred to above for the two sample truck models, determined by detailed FE analysis utilizing the wheel strut pressures, speed and accelerations/decelerations monitored during extensive testing that can be used to accurately estimate the stress and/or cumulative damage that the truck chassis experiences during a range of operating modes (racking, pitching, rolling, bouncing and loading/unloading. These most critical locations are required to reliably determine the high damage that the chassis sees during its travel from loading (symmetrical/unsymmetrical loading) to dumping and under the changing haul road conditions (driving off the pits, haul road, turning in the haul road, uneven in the haul road, driving into dump) and can vary for each type of truck which has to be determined by detailed analysis on a case by case basis. Computer structural modelling is an important tool in determining the best strain gauge locations. A 3-dimensional FE model of the chassis is developed by direct measurement of each component, including its material type and thickness or the manufacturer supplied drawings and welding parameters. The model is then subjected to finite element analysis (FEA) of the range of operating states in which the truck chassis sees during its travel, such as racking, rolling and/or pitching, under the different haul road conditions and loading and unloading. The loading conditions used for the analysis are derived by extensive measurements conducted on several trucks in various mine sites.

As a result of these analyses, several critical locations are then identified typically as regions of sensitive locations on the chassis that can accurately measure the strain required to estimate the stress/cumulative damage the chassis sees during the operation. Some of the strain gauge locations will be more critical for strength, whereas others will be more critical for fatigue. However in trucks fatigue is the dominant factor. The critical sensor locations vary based on the chassis design.

Some of the strain gauge locations will be points close to the actual predicted failure point, others will be points where measurement best helps predict undesirable stress or fatigue at another unmeasured location. For example for the Cat 793C or 793D chassis the provision of strain gauges at specific locations such as the torque tube to main rail connection 109 is a point of failure and is significantly influenced by racking, whereas the superstructure beam (100) is more affected by pitching. For the 797 chassis main rail casting welds 302, 304, 305, 313 the cumulative damage is significantly influenced by racking and pitching. Sensors can be introduced in the tray main rail to identify tail sweeping when unloading for both truck models.

Operating experience of actual failures observed in the field is simulated utilizing the FE models created to confirm its accuracy. The operating experience is also used to directly define some strain gauge locations. The FE analysis will help precisely identify the location at which to best place the strain gauge, which typically is best placed with a tolerance of 30-50 mm.

Wheel Strut Pressure and Lift Cylinder Pressures

The wheel strut pressures provide the support forces given by the wheels and primary assessment at operating states of racking, rolling, and pitching of the chassis. A change in strut pressures when stationary is used to determine a loading operating state, as it is done currently by the manufacturer. The lift cylinder pressures are used to determine the operating states of the start and end of unloading.

Specification of Strain Gauges, Fitting and Processing:

Analogous to the description above in relation to the excavator embodiment, the strain gauges are fitted at locations which are most sensitive the various modes—loading/unloading, racking, pitching, and rolling. The measurement range for the strain gauges is around .+−.500 MPa (.+−.2500 µs) with signal conditioning units have a dynamic range of ±1000 MPa (.+−.5000 .µs) and contains anti-aliasing filters and digital filters accurately measure up to a frequency range of 500 Hz with 16 bit resolution. The channel configuration defining the sensor location, type, and calibration factors to be used are specified and are stored in configuration files. Since the strain gauges are to be used to compute absolute measures of stress, care is taken to install them with the appropriate waterproofing to minimize signal degradation. Drift is also automatically detected and the system balanced and calibration parameters updated regularly—drift in a strain gauge can be detected by calibrating strain to zero when the truck is stationary on level ground with no load. Drift of sensors will affect the strength criteria as it will introduce an apparent additional strain (additional) to the dynamic strain measurement. The drift of sensors does not affect the rainflow analysis of cumulative damage calculations.

Load Gauges

The system comprises load gauges to help identify operating states. The Wheel strut pressures are combined in the following manner to determine the operating states of racking, pitching and rolling.

Racking=PFR+PRL−(PFL+PRR)

Pitching=PFR+PFL−(PRR+PRL)

Rolling=PFR+PRR−(PFL+PRL)

where
PFR=Strut Pressure (force) Front Right Hand Side
PFL=Strut Pressure (force) Front Left Hand Side
PRR=Strut Pressure (force) Rear Right Hand Side
PRL=Strut Pressure (force) Rear Left Hand Side Position and Acceleration Gauges.

The GPS: The speed and location of the truck is monitored by a global position system (CPS) receiver. Acceleration is measured by acceleration sensors.

Data Acquisition and Calibration

The data acquisition hardware and data processing for the truck example is also analogous to the excavator example.

The data acquisition unit is programmed to take samples up to 1250 times per second (up to 500 Hz may be useful). Raw data is used by the processor to calculate absolute measures of stress and accumulated fatigue, using a range of calibration constants, some predetermined based on the fatigue category detail, dead weight of the system at predefined by the unloaded stationary state and some updated by regular calibration as required by the system software. Raw data is kept to investigate any incident, bad operating practices or when a failure occurs. The raw data can be replayed to clearly identify the root cause for incident of extreme high stress or bad practice at any instant.

The actual stress at a measurement location is calculated by multiplying the measured strain by Young's modulus for the grade of steel at the measurement location. A reference value of maximum allowable tensile or compressive stress (or "strength") associated with the strain gauge location can be calculated, from a stress at which the equipment is predicted to fail or maximum at which it should operate, either at the strain gauge location itself or at other non-measured locations predicted to be most vulnerable based on a FE analysis, multiplied by a safety factor.

The system calculates for data presentation purposes normalized compressive and tensile stresses as a ratio or percentage of the measured stress to the maximum allowable stress taking into account the dead load stress for the particular location at the unloaded stationary level position using FEA.

Display of Normalized Measures and Advice

During hauling: The display will alarm if normalized stresses exceed the 100% value instantaneous and/or when the cumulative damage for specific distance traveled exceed threshold limits. The combined effect of haul road conditions and loading conditions is taken into account. Information can be provided to a 3rd party display system (Modular, Caterpillar, Leica JigJaw) to display this information to the operator. The data can also be transferred to central dispatch with alarm levels and exact location on the haul road where the alarms occurred. The amount of recommended speed reduction will depend on the location and dominant operating mode detected—racking, pitching or rolling, by an amount which can be determined by formulae derived from operating experience with the truck on the route and/or simulation of the likely effect on the stress of reduced speed.

During loading: If the threshold limits exceed the 100% levels due to racking of the chassis due to uneven loading or loading of the truck on uneven ground (one wheel not supported), an alarm is provided to the operator instantaneously via a 3rd party display so that the operator could more truck reduce racking. The cumulative damage is calculated for the full loading processes i.e. from the time loading starts to the time the truck starts to drive off.

During Unloading: If the threshold limits exceed the 100% levels during unloading process, an alarm will be provided to the operator instantaneously via a 3rd party display. The sensors (strain gauge) will determine whether the high stresses are due to "tail sweeping" (a bad practice where the tray is pulled against the dirt when unloading) and can alarm the operator via the 3rd party display. The cumulative damage is calculated for the full unloading processes i.e. from the time the strut starts to lift the tray and until tray rests back on the chassis.

EXAMPLE 3

Electric Rope Shovels

With electric rope shovels, a key goal of the monitoring system is typically to minimize the damage on the boom and dipper handle. However monitoring of the dipper handle is not possible because it slides within the boom saddle block. Hence it is extremely difficult to locate sensors on the handles. This difficulty is overcome by locating sensors on critical locations on the boom to derive the fatigue that the boom experiences and this can be used from the FEA modelling to infer damage occurring in the dipper handle. Lateral bending of the dipper handles during operations (swing with the dipper engaged in dirt) contribute significantly to the most common failure mode of the dipper handles.

As with the previous examples on excavators and trucks, the system applied to shovels can alarm the operator when the peak stresses/fatigue damage reaches derived limits for the different conditions the shovels experiences during operations.

Recent upgrades introduced to the control system by the OEM do not allow swinging while digging due to concern that it damages the dipper handle. The dipper handle structure can take certain amount of lateral bending but would sustain significant damage if design limits are exceeded. The OEM's approach does not allow any lateral bending which limit performance of the shovel and would have a major impact on production.

Referring now to FIGS. 7a, 7b, 7c and 8, recommended sensor locations on the boom of a P&H4100XPB electric shovel are shown, as determined by FEA modelling. Persons familiar with this model of shovel will understand the diagrams as they relate to the boom where the dipper handle is supported and slides with other parts of the shovel.

By locating sensors in critical locations 405, 406, 407 & 408, the system can provide guidelines to allow for some flexibility to swing while digging (creates side loading hence lateral bending of the handles) but operate within design limits and alarming when peak stresses/fatigue damage exceeds threshold limits of the dipper handle.

The clearances should be set up and maintained to specified values. By frequently measuring the clearance between the boom and the dipper handles and inputting this information, the system to alarming criteria can be changed to ensure that the handles are operating within design limits. Detailed FEA has been conducted to develop these relationships. With the critical sensor locations 405, 406, 407 and 408, the system can assist the machine to operate within design limits based on the clearance and alarm threshold set up. The high stresses in the dipper handle due to lateral bending and torsion and at the torque tube connection to the handles can be significant reduced.

Vibrations can occur at start of digging when near to tracks and/or due to dipper impact on the ground. These can cause significant damage to the boom and revolving frame structure. Critical sensor location 411 & 412 can measure the vibrations that the boom experiences. The system can quantify damage and alarms with specified threshold limits to indicate these occurrences to the operator and operations.

The sensors 401, 402, 403 and 404 will also monitor the vibrations during start of digging due to the dipper impacting the ground in the shipper shaft area.

Boom jacking, using the bucket to jack the machine up, assumes high stress in the boom but has not been quantified. A combination of sensor locations in the boom can be utilized to monitor and quantify the damage to the boom with alarm threshold limits.

Additional measurements other than strain that may be useful in determining the operating state include electrical motor outputs for all motions, operator references, the hoist rope lengths and crowd position for electrical shovels Upgrading of control systems to digital or the used of AC motors with digital control systems can introduce high vibrations in the entire shovel structure if the setup is not optimized. These have resulted in significant reduction in rope life and major increase in boom and revolving frame cracking. Utilizing the above mentioned critical sensors of the system and electrical outputs, the controls system set up including the reference shaping functions (ramps and filtering) for the various motions can be optimized to minimize the vibrations that the machine experiences and maximize production.

The system can help the operator change the way one digs to maximize productivity while minimizing the fatigue damage to the boom, dipper handle and revolving frame.

The system can be expanded to monitor critical areas in the revolving frame and car body of a shovel.

EXAMPLE 4

Drills

Figure 9:
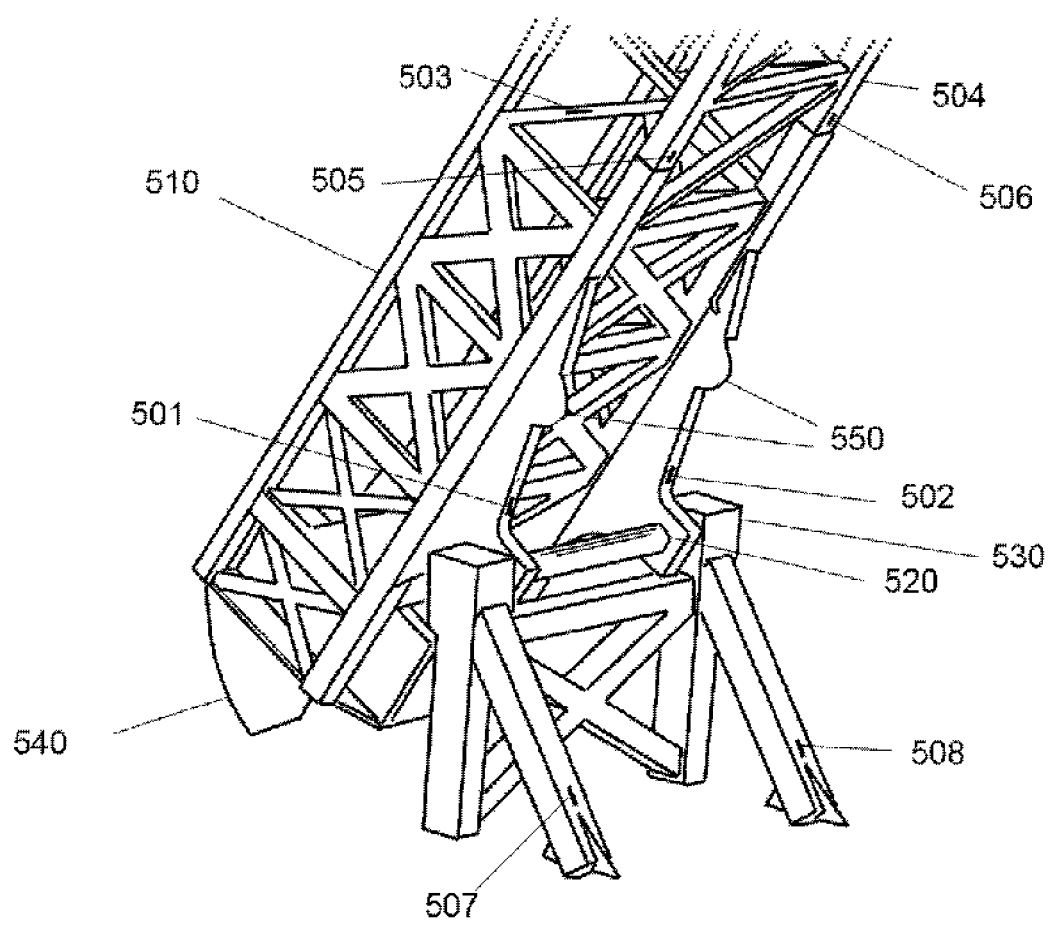
FIG. 9 is a part view of a drill, near the pivot point of the mast.

Referring to FIG. 9, which shows a part of a Reedrill SKSS drill, a bottom part of the mast 510 can be seen at 30° to the vertical orientation. Mast 510 pivots on a fixed support 530 about an axle 520 by the operation of mast raising cylinders (not shown) attached to attachment points 550 and is lockable into a vertical position or to various set angles to the vertical by pins engaging through mast locking pin insertion plate 540. Critical locations for the strain sensors are 501 and 502 on near the axle, 503 and 504 on a mast diagonal (504 is not visible, disposed on the corresponding side to 503), 505 and 506 on mast main chords, and 507 and 508 on the fixed support A-frame rear legs.

For drills additional measurement parameters besides strain are pull down pressures, hoisting/lowering ramp pressures, rotational torques, mast angle and lockout position (whether locking pins are engaged or not) and pressures to recognise tramming condition.

The primary failure modes for drills are: cracking of the mast main chord near the hoist cylinder; cracking of the A-frame rear leg; and breaking of the mast pivot bolts.

A common cause of primary failure modes is the application of the mast hoist cylinder force to raise the mast with the mast pin engaged which creates very high tensile forces in the above areas. The operator may also toggle the hoist to disengage the pin when it is stuck after drilling.

The system can alarm when this occurs to prevent the operator doing this and also estimate the cumulative damage experienced by these components.

In prior art systems there is no indication to the operator that the pin is engaged or not and the cumulative damage caused when the hoist is toggled to release the pins. The system can quantify the cumulative damage and can trigger inspections of these areas when pre-set threshold limits for cumulative damage are exceeded so that cracking of these components can be detected at early stage to prevent catastrophic failures.

The cumulative damage while drilling and tramming, etc. can also be quantified but are generally low compared to the causes outlined above.

Advantages of the Invention

As described above, the invention allows for the first time a real-time assessment of the parameter of most interest to the mine operator—how much is the current operation and operator practices damaging the equipment and affecting the productivity and maintenance cost?

In the context of the excavator and truck examples above, the detailed capabilities enabled are to:

Minimize stresses/cumulative damage of boom and stick, hence reduce risk of catastrophic failure(s);

Maximize production whilst operating within a safe working envelope;

Provide guidance/assistance to operators through real-time display in operator cabin;

Provide feedback to operations on machine performance;

Monitor damage accumulated during operations;

Record comprehensive information measured during operations stored in database for structural integrity management, maintenance planning and operator training;

Give feedback to reduce truck speed based on cumulative damage the truck sees during hauling due to racking, rolling and pitching or a combination of these criteria.

During loading give feedback if chassis stress limits exceed due to racking or during dumping if tail sweeping occurs; and Record up to 500 Hz raw data for detailed incident investigation and RCA in the event of a failure.

Further advantages specific to electric rope shovels and drills have been outlined in the description under Examples 3 and 4 above.

The process of conceiving and experimenting in the course of developing invention has already resulted in an important insight in relation to excavators—double benching has been wrongly singled out by manufacturers as the cause of accelerated damage and should not be blamed for equipment failure or be subject to a blanket prohibition. FEA has shown that although double benching is a high stress operating practice, many other operating practices, such as below ground digging, can be highly damaging. The monitoring system of the invention enables rational operation of the equipment and real-time feedback on the actual damage, enabling the operator to use the equipment safely in a wide range of modes.

Persons skilled in the art will also appreciate that many variations may be made to the invention without departing from the scope of the invention.

For example, while the detailed FEA analysis described is needed for best applying the invention, any workable method of identifying these locations is within the broadest scope.

Further, while the examples are provided in relation to hydraulic excavators, trucks, electric rope shovels and drills, other analogous earthmoving equipment can analogously benefit from adaptations of the invention, including hydraulic shovels, wheel loaders and graders. It will be appreciated that while the details may vary, what is central to the invention is the measurement of actual values of stress and/or accumulated fatigue enabled by a detailed application of the engineering parameters and informed choice of strain gauge locations.

In the case of hydraulic shovels in addition to the critical locations and other parameters (strut pressure and inclinometers for configuration) measured in excavators, the bucket release pressures are measured. The critical sensor locations are based on similar analysis for excavators.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but features in various embodiments of the invention.

It is to be understood that, if any prior art publication is referred to herein, such reference does not constitute an admission that the publication forms a part of the common general knowledge in the art, in Australia or any other country.

A predecessor in title to the invention has previously commercialized an earlier variant of the invention on draglines in Australia without making enabling public disclosures by use or documentary publication.

What is claimed is:

1. A monitoring system comprising a combination of a truck, gauges, and computing equipment, the monitoring system functional to calculate, measure and display accumulated damage or closeness to failure, the truck comprising:
   a chassis; and
   the truck suitable for hauling earth on a road, said hauling subjecting the chassis to forces from racking, pitching, rolling, bouncing, loading and unloading;
the gauges comprising:
   a plurality of strain gauges each gauging strain at one of a plurality of strain gauge locations on the chassis, the plurality of strain gauge locations including critical locations at which a failure is predicted to occur in one or more of a range of operating states of the truck or which are adapted to predict a failure in another location on the chassis; and
   wheel strut pressure gauges adapted to gauge whether the truck is racking, pitching or rolling;
the computing equipment comprising:
   a data acquisition unit, being a component of the computing equipment, the data acquisition unit adapted to acquire real-time data from the strain gauges and the wheel strut pressure gauges;
   a processor and non-transitory computer readable memory adapted to process the acquired real-time data from the strain gauges and the wheel strut pressure gauges to determine one or more measures of actual instantaneous stress and a real-time operating state from the range of operating states, and adapted to determine real-time information derived from the real-time operating state; and
   at least one output device, at least one of which is configured to provide information comparing the one or more measures of actual instantaneous stress with corresponding reference values of maximum allowable stress, and to provide the real-time information derived from the real-time operating state; and
wherein the real-time information derived from the real-time operating state comprises an amount of cumulative damage or closeness to failure having regard to the one or more measures of actual instantaneous stress and the real-time operating state.

2. The monitoring system of claim 1, wherein the critical locations include one or more locations sensitive to failure during racking.

3. The monitoring system of claim 1, wherein the critical locations include one or more locations sensitive to failure during pitching.

4. The monitoring system of claim 1, wherein the critical locations include one or more locations adapted to identify tail sweeping.

5. The monitoring system of claim 1, further comprising sensors adapted to measure position and acceleration of the truck.

6. The monitoring system of claim 1, wherein the one or more measures of actual instantaneous stress are calculated by multiplying the real-time data from the strain gauges by a Young's modulus for a grade of steel at each strain gauge location.

7. The monitoring system of claim 6, wherein the processor and non-transitory computer readable memory is adapted to calculate a reference value of maximum allowable tensile or compressive stress associated with each strain gauge location, from a stress at which the failure is predicted or a maximum stress of operation multiplied by a safety factor, and the real-time information includes a ratio or percentage of the one or more measures of actual instantaneous stress compared to the reference value.

8. The monitoring system of claim 1, wherein the real-time information derived from the real-time operating state includes an amount of recommended speed reduction during a hauling operation if the amount of cumulative damage or closeness to failure exceeds threshold limits.

9. The monitoring system of claim 1, wherein the real-time information derived from the real-time operating state includes a recommendation to move the truck during a loading operation if the amount of cumulative damage or closeness to failure exceeds a threshold limit as a result of racking.

10. The monitoring system of claim 1, wherein the real-time information derived from the real-time operating state includes a recommendation to correct a tail-sweeping operating state detected during an unloading operation.

11. The monitoring system of claim 1, wherein the output device is adapted to provide the real-time information to an operator of the truck.

12. The monitoring system of claim 1, wherein the output device is adapted to provide the real-time information to a remote monitoring center.

* * * * *